Sept. 12, 1967 F. N. SELBER 3,341,839

NEGATIVE RESISTANCE DEVICES

Filed July 2, 1963 2 Sheets-Sheet 1

INVENTOR,
FRANKLIN N. SELBER.

BY Harry M. Saragovitz,
Edward J. Kelly,
Herbert Berl &
Julian C. Keppler

ATTORNEYS.

INVENTOR,
FRANKLIN N. SELBER.
BY Harry M. Saragovitz,
Edward J. Kelly,
Herbert Berl &
Julian C. Keppler ATTORNEYS 3,341,839

NEGATIVE RESISTANCE DEVICES

Franklin N. Selber, Eatontown, N.J., assignor to the United States of America as represented by the Secretary of the Army Filed July 2, 1963, Ser. No. 292,789
3 Claims. (Cl. 340—347)

The invention described herein may be manufactured and used by or for the Government for governmental purposes without the payment of any royalty thereon.

The present invention relates to negative resistance devices and more particularly to novel and useful negative resistance devices which may be easily adjusted to fit various circuit requirements and logical circuitry including such negative resistance devices.

The negative resistance device of the present invention is a two-terminal device in which the voltage vs. current ($v$ vs. $i$) characteristic contains two regions of positive incremental resistance joined by a region of negative incremental resistance. Several semiconductor devices, including tunnel diodes, binistors and point-contact transistors, exhibit such a characteristic. Since the region of negative resistance represents an unstable state between two stable positive resistance regions, such a device is bistable and can therefore function as a logical element in a binary digital circuit. By interconnecting a plurality of negative resistance devices in series or parallel to a common source, a multistable device with a complex composite $v$ vs. $i$ characteristic will result. Such a circuit may be used to perform various digital functions such as binary addition, counting and analog-to-digital conversion. In order to produce a desired composite voltage vs. current characteristic required for a particular application, it is often necessary that each negative resistance device have a different $v$ vs. $i$ characteristic. This is difficult to obtain with the elementary negative resistance devices mentioned above. A tunnel diode, for example, will have a fixed $v$ vs. $i$ characteristic depending on the semi-conductor material and dimensions, etc. It would be possible to build up a desired composite $v$ vs. $i$ characteristic by using different types of these elementary negative resistance devices, but the number of stable states of such a multistable device would be limited by the number of diverse types of negative resistance devices available and further the design of such circuitry would be limited by the fixed characteristics of these elementary negative resistance devices.

In one aspect of the present invention these difficulties are overcome by providing a two-terminal negative resistance device comprising a plurality of circuitry elements including active elements. By the proper adjustment of the circuit parameters, the $v$ vs. $i$ characteristic of the device may be accurately and continuously controlled, thus providing a convenient and useful building block for logical circuitry of the multistable negative resistance type.

In another aspect of the present invention, these negative resistance devices have been utilized to provide a novel and useful analog-to-digital encoder.

It is therefore an object of this invention to provide novel and useful negative resistance devices.

It is a further object of this invention to provide a two-terminal negative resistance device with adjustable characteristics.

Another object of this invention is to provide a multistable logical circuit comprising a plurality of negative resistance devices.

A further object of the present invention is to provide a novel and useful analog-to-digital encoder comprising a plurality of negative resistance devices.

These and other objects and advantages of the invention will become apparent from the following detailed description and drawings, in which.

Figure 1:
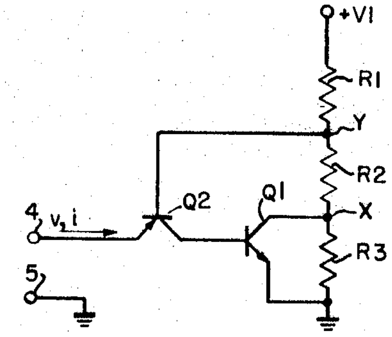
FIG. 1 is one embodiment of the two-terminal negative resistance device of the present invention.
Figure 2:
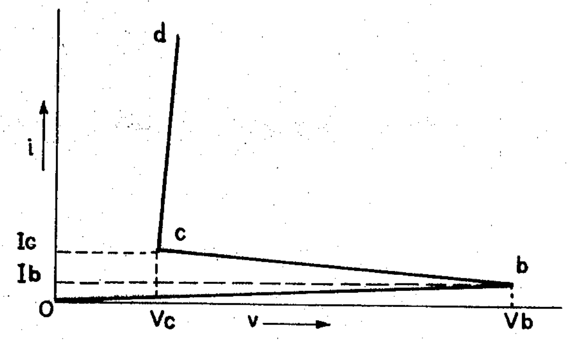
FIG. 2 is the voltage vs. current characteristic of the circuit of FIG. 1.

In FIG. 1, three resistors R1, R2 and R3 are serially connected between a source of positive bias voltage, V1 and ground. NPN transistor Q1 has its collector connected to the point X which is the junction of R2 and R3 and its emitter grounded. The base of PNP transistor Q2 is connected to the point Y which is the junction of R1 and R2 and its emitter to terminal 4. The collector of Q2 is connected to the base of Q1. FIG. 2 is the static voltage vs. current characteristic of the circuit of FIG. 1 as an increasing direct current is applied to terminals 4 and 5. At input currents between O and $Ib$ the circuit exhibits a high positive resistance, as indicated by the portion of the curve O–$b$. At current $Ib$ the circuit switches into a negative resistance region, indicated by the negative slope of the curve between $b$ and $c$. At currents above $Ic$ the circuit exhibits a low positive incremental resistance, as indicated by the steep slope of the curve in the region $c$–$d$. The base-emitter junction of transistor Q2 has a reverse bias applied to it from point Y of magnitude $$\frac{R2+R3}{R1+R2+R3}(V1)$$

Therefore at input voltages below $$\frac{R2+R3}{R1+R2+R3}(V1)$$

both transistors will be cut off and the resistance between terminals 4 and 5 will be merely the high leakage resistance of Q1. When the input voltage at terminal 4 exceeds the voltage at point Y, the base-emitter junction of Q2 becomes forward biased, Q2 becomes conductive and applies a forward bias current to the base-emitter junction of Q1, which in turn renders Q1 conductive. The conduction of Q1 draws additional current from V1 and hence lowers the voltage at point Y. This results in a greater forward bias across the emitter-base of Q2 and causes more conduction therein, which in turn further lowers the voltage at Y. It is this regenerative action which gives rise to the negative resistance portion of the circuit, $b$–$c$. The negative resistance or regeneration of the circuit rapidly saturates both Q1 and Q2. When Q1 saturates, R3 is shorted out by the low impedance of the collector-emitter circuit of Q1 and regeneration is no longer possible. The circuit then shifts into the low positive resistance region $c$–$d$. The voltage at which this shift or transition takes place is $Vc$. Since at point $c$ of FIG. 2, Q2 is saturated, the emitter thereof will be at substantially the same potential as the base, that is, the terminal voltage at 4 will be substantially the same as that at point Y. Since R3 is shorted out by Q1, the voltage at Y will be approximately equal to $$\frac{R2}{R1+R2}(V1)=Vc$$

Thus it can be seen that the transition or switching points of the circuit, $b$ and $c$, can be independently varied or controlled by the proper choice of the three series resistors R1, R2 and R3 and the bias voltage, V1. This follows from the fact that the resistance of R3 affects the voltage $Vb$ but does not affect the voltage $Vc$. The circuit of FIG. 1 may be thought of as a controllable negative resistance switch, the high impedance region *o–b* being the open position and the low impedance region *c–d* being the closed position. The state or position of the switch is indicated by the voltage at point X, being positive if the switch is open and substantially zero if closed.

Figure 3:
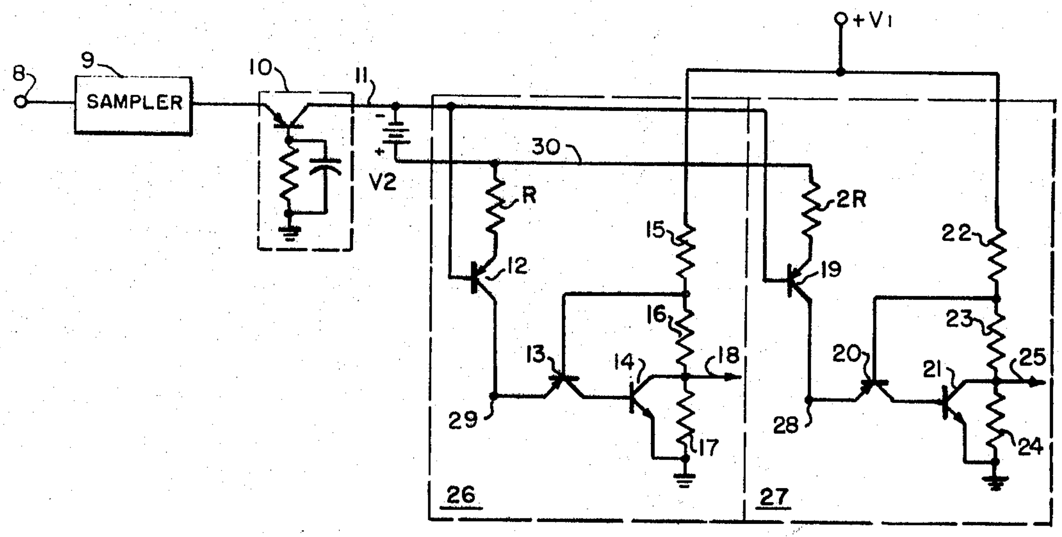
FIG. 3 is an analog-to-digital encoder incorporating the negative resistance devices of the present invention.

FIG. 3 is a circuit diagram of a novel analog-to-digital encoder which illustrates a practical application of the negative resistance switch of FIG. 1. In FIG. 3 an analog voltage, for example a speech waveform, is applied to sampler 9 from terminal 8. The sampler 9 contains circuitry for periodically sampling the amplitude of the analog input and producing a train of amplitude modulated pulses having the envelope of the analog input. The circuit details of sampler 9 are well known in the art of pulse code modulation and, per se, form no part of the present invention. The pulse train from sampler 9 is fed to current driver 10 which comprises a grounded base transistor amplifier. Such a circuit exhibits a low input impedance and a high output impedance and therefore approximates a source of constant current. The output of current driver 10 is applied to line 11. The encoder comprises two parallel branches 26 and 27. The applied current pulse on line 11 will cause one or more of the parallel branches 26 and 27 to switch on depending on the magnitude of the current pulse and therefore provide a digital representation of the analog input. The two-branch circuit illustrated will encode the input analog signal to one of four levels, however greater encoding accuracy can be obtained by adding more similar parallel branches, but the principle of operation will remain the same.

Figure 4:
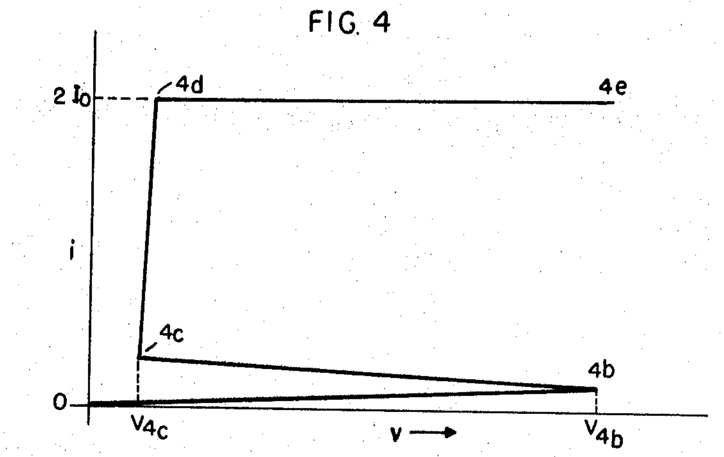
FIGS. 4, 5 and 6 are curves illustrating the principle of operation of the circuitry of FIG. 3.
Figure 5:
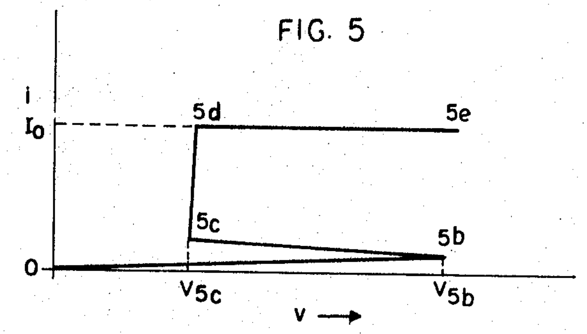

The branch 27 includes a negative resistance switch similar to that of FIG. 1, comprising three series connected resistors 22, 23 and 24, transistors 20 and 21, positive bias voltage V1 and input terminal 28. All of these elements correspond to the similarly disposed elements in FIG. 1. The transistor 19, resistor 2R and bias source V2 comprise a current limiter connected between line 11 and terminal 28 of the negative resistance switch. The bias source V2 supplies a forward emitter-base current of approximately $V2/2R$ to PNP transistor 19. This current flows out of the positive terminal of V2, line 30, resistor 2R, across the emitter-base junction of transistor 19 and back to the negative terminal of V2 via line 11. The forward bias current normally provides a substantially zero impedance path between the input line 11 and terminal 28 via the base-collector junction of transistor 19. However, when the current supplied to branch 27 from current driver 10 exceeds $V2/2R$, the base-emitter of 19 becomes back biased and limits the flow of current to terminal 28 to approximately $V2/2R$. The operation of branch 27 will be better understood with reference to FIG. 5, which illustrates the *v* vs. *i* characteristic of branch 27. It can be seen that the portion of this curve O–*5b*–*5c*–*5d* is the characteristic of the negative resistance switch in branch 27, the mode of operation of which was described in connection with FIGS. 1 and 2. The portion of this curve *5d*–*5e* is due to the current limiting action of the transistor 19. The current I*o* in FIG. 5 represents the setting of the current limiter and is equal to $V2/2R$. The voltages V5*b* and V5*c* are respectively the turn-on and turn-off voltages of branch 27, and are determined by the relative values of resistors 22, 23 and 24 according to the design criteria set forth in connection with FIGS. 1 and 2. Thus, in the off condition this branch will draw substantially zero current from the current driver 10 and in the on or conducting condition will draw a current I*o* determined by the setting of the current limiter therein. The circuitry of branch 26 is the same as branch 27 but with different adjustments to provide a different *v* vs. *i* characteristic. The negative resistance switch of branch 26 comprises the resistors 15, 16 and 17 and transistors 13 and 14 and the current limiter thereof comprises the transistor 12, resistor R and bias supply V2. FIG. 4 is the *v* vs. *i* characteristic of branch 26. According to the invention, the turn-on voltage of this circuit, V4*b* is adjusted to be higher than the turn-on voltage of branch 27 and the turn-off voltage V4*c* is adjusted to be lower than the turn-off voltage of branch 27. Also, since the resistor R has half as much resistance as the resistor 2R of branch 27, the current limiter of 26 will have a setting of $$2I_o=\frac{V2}{R}$$

or twice that of the limiter of branch 27.

Figure 6:
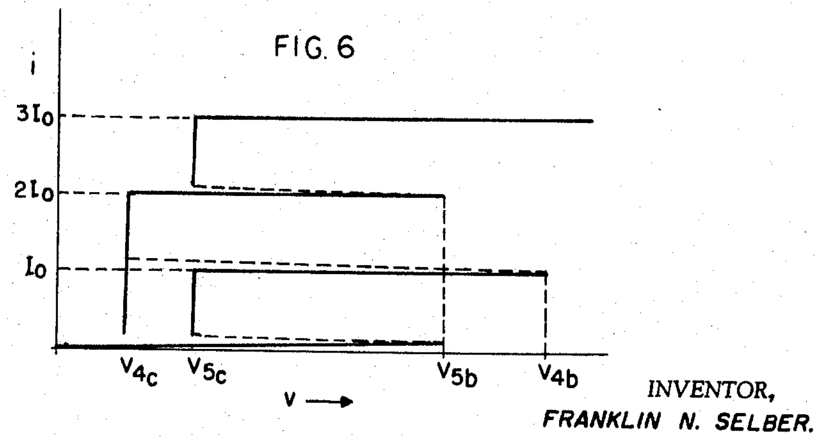

FIG. 6 is the composite *v* vs. *i* characteristic of both branches 26 and 27. The encoding operation can be understood with reference to the FIG. 6. Both branches are normally in the off or non-conducting condition. The sampler 9 produces a pulse with the instantaneous amplitude of the analog input signal. The current driver transforms this pulse into an equivalent constant current pulse, that is, the current driver approximates a constant current source and the magnitude of the current will be proportional to the amplitude of pulse fed thereto from sampler 9. The current pulse from 10 is applied in parallel to branches 26 and 27 over line 11. The current pulse will necessarily have a finite rise time and the operation will be analyzed on the basis that the switching speeds of the branches 26 and 27 are faster than the current pulse rise time. Initially both branches are non-conducting and hence are both in the high impedance state. Therefore, as current on line 11 rises from zero the voltage thereon will rapidly increase. When the voltage on line 11 reaches the turn-on voltage of branch 27, V5*b*, the negative resistance switch therein will turn on and this branch will draw a fixed current of I*o* from the current driver, due to the action of the current limiter of branch 27. If the magnitude of the current output of 10 is greater than I*o*, the voltage on line 11 will continue to rise, since branch 27 can absorb only a current of I*o*. When the voltage reaches the turn-on voltage of branch 26, V4*b*, this branch will turn on and draw a fixed current of 2I*o* determined by the setting of the current limiter therein. As can be seen from FIG. 6, the turn-off voltage of branch 26, V4*c*, is lower than the turn-off voltage of branch 27, V5*c*. Therefore, when branch 26 turns on, the voltage on line 11 will be insufficient to maintain branch 27 in the on or conducting state and branch 27 will turn off. If the current output of 10 exceeds 2I*o*, the voltage of line 11 will then rise from the value of V4*c* toward V5*b*. When the voltage reaches V5*b*, branch 27 will again switch on and this branch will absorb a current of I*o*. The voltage of line 11 will then drop to V5*c* and both branches will remain in the conducting state, and will together draw a current of 3I*o* from current driver 10. The sampler 9 and current driver 10 are designed so that 3I*o* is the maximum possible current which can be applied to line 11, that is, the maximum value of the analog signal input to the sampler is arranged to produce a current pulse of 3I*o* and lesser values of the analog signal produce proportionally smaller current pulses. It can be seen that the branches 26 and 27 encode or quantize the magnitude of this current pulse to one of four discrete levels according to the binary code, and the level can be determined by noting or sensing the conducting states of these two branches after all of the above-described switching operations have taken place and the circuit reaches equilibrium. The conducting state of the branches will be indicated by the state of the voltage at the terminals 18 and 25, being substantially zero for the conducting state and a positive voltage for the non-conducting state. These terminals may be connected to a utilization device, for example, a pulse code modulation transmitter or line, for transmission of the digitally coded signal to a remote point. These four levels are O, I*o*, 2I*o* and 3I*o*. A current pulse of I*o* will turn on only branch 27, a current pulse of 2I*o* will turn on only branch 26 and a current of $3I_o$ will turn on both branches. Thus the current is encoded in binary fashion with the branch 27 providing the least significant bit and branch 26 the most significant. In most practical applications of this circuitry it would be necessary to encode with greater accuracy than is possible with the four-level encoder illustrated. This can be easily accomplished by adding more parallel branches similar to those illustrated. The number of encoding levels will equal $2^n$, where $n$ is the number of branches. The principle of operation is the same no matter how many branches are included. It should be noted that in the encoder of FIG. 3, the turn-on voltage of the least significant branch 27 is lower than the turn-on voltage of the most significant branch 26 and the turn-off voltage of branch 27 is higher than the turn-off voltage of branch 26. If additional branches are added, a similar relationship must be maintained. For example, if a third branch is added to the left of branch 26 in FIG. 3, this would become the most significant branch and its turn-on voltage would be adjusted to a higher value than that of branch 26, and its turn-off voltage lower than that of branch 26. Also the current limiter of this third branch would be set at twice the current of that of branch 26. In general, each branch must have a turn-on voltage higher than and a turn-off voltage lower than those of the next lesser significant branch.

The encoder illustrated in FIG. 3 is a linear encoder in that the encoding levels are equally spaced apart. This equal spacing is due to the fact that most significant branch absorbs a current twice as high as that of the least significant branch. In the encoding or quantizing of certain analog signals, for example speech signals, it is often desired to encode in a non-linear fashion. In speech signals most of the intelligence is contained in the lower amplitude regions of the waveform, that is, the peak amplitude of the waveform is many times higher than the average amplitude. Therefore, it is desirable to arrange the encoding levels closer together in the lower amplitude regions of the speech waveform. After transmission the digital signals are decoded in a circuit which is non-linear in a complementary manner in order to correct the distortion caused by the non-linear encoding operation. The circuit of FIG. 3 can be easily adapted to this type of non-linear encoding. This is accomplished by designing the current limiters of the different branches so that each branch under certain conditions draws more or less than twice as much current as the next less significant branch. This will result in non-linear encoding.

While the invention has been described in connection with a preferred embodiment, many modifications therein are possible without departing from the inventive concepts disclosed herein, hence the invention should be limited only by the scope of the appended claims.

What is claimed is:

1. A two-terminal negative resistance device comprising first and second terminals; first, second and third resistors connected in series between a source of voltage and said second terminal, a first transistor with its collector connected to the junction of said second and third resistors and its emitter connected to said second terminal, a second transistor with its emitter-base junction connected between said first terminal and the junction of said first and second resistors, and a connection between the base of said first transistor and the collector of said second transistor.

2. A negative resistance switch with adjustable characteristics comprising, first and second terminals, first, second and third resistors connected in series between a source of bias voltage and said second terminal, first and second transistors, the emitter-base junction of said first transistor connected between said first terminal and the junction of said first and second resistors and the emitter-base junction of said second transistor connected between the collector of said first transistor and said second terminal, a connection between the junction of said second and third resistors and the collector of said second transistor, the polarity of said bias voltage being chosen to apply a reverse bias to the emitter-base junction of said first transistor, and means to apply an input voltage to said first and second terminals of such polarity to oppose said reverse bias, whereby said switch exhibits a negative resistance characteristic between said first and second terminals.

3. A negative resistance analog-to-digital encoder comprising, a plurality of parallel connected branches, each of said branches representing a binary digit of different significance, each branch including a series connected current limiter and a negative resistance switch, said negative resistance switch comprising, first, second and third resistors connected across a source of bias voltage, a first transistor with its emitter connected to the output of said current limiter and its base connected to the junction of said first and second resistors, a second transistor with its collector connected to the junction of said second and third resistors and its emitter to the negative terminal of said source of bias voltage, a connection between the collector of said first transistor and the base of said second transistor, means to apply a pulse of current to said parallel connected branches, the magnitude of said current being proportional to the instantaneous amplitude of the analog signal to be encoded, the current limiters of each branch being arranged to pass a current proportional to the significance of the binary number represented thereby, the negative resistance switch of each of said branches having a turn-on voltage greater than and a turn-off voltage less than the corresponding voltages of the branch of next lesser significance, and means to sense the state of conduction of said branches to provide a digitally coded representation of said analog signal.

References Cited

UNITED STATES PATENTS

| | | | |
|---|---|---|---|
| 3,036,226 | 5/1962 | Miller | 307—88.5 |
| 3,040,186 | 6/1962 | Duzer | 307—88.5 |
| 3,041,469 | 6/1962 | Ross | 340—347 |
| 3,046,543 | 7/1962 | Kaenel | 340—347 |
| 3,210,564 | 7/1963 | Rabinovici et al. | 307—88.5 |

OTHER REFERENCES

Electronics, Aug. 19, 1960, pp. 59–61 relied on (copy in Scientific Library or Group 250).

DARYL W. COOK, *Acting Primary Examiner.*

MAYNARD R. WILBUR, *Examiner.*

W. J. KOPACZ, K. R. STEVENS, *Assistant Examiners.*